United States Patent [19]
Basile

[11] 3,896,969

[45] July 29, 1975

[54] WATER SEALING CONSTRUCTION

[76] Inventor: Mario J. Basile, 8512 Fifth Ave., Brooklyn, N.Y. 11209

[22] Filed: May 2, 1973

[21] Appl. No.: 356,338

[52] U.S. Cl. ................ 222/54; 52/169; 206/411
[51] Int. Cl. .......................................... B32b 3/12
[58] Field of Search ...... 252/315, 316; 52/173, 169; 206/.5; 161/113; 175/72; 222/54; 220/DIG. 30; 206/411

[56] References Cited
UNITED STATES PATENTS

| | | | |
|---|---|---|---|
| 2,750,027 | 6/1956 | Cummings | 206/.5 |
| 2,907,682 | 10/1959 | Eichel | 206/411 X |
| 3,362,476 | 1/1968 | Pollen | 175/72 X |
| 3,445,322 | 5/1969 | Saiia et al. | 52/169 |
| 3,561,177 | 2/1971 | Agro et al. | 52/173 |
| 3,657,379 | 4/1972 | Hilbelink | 252/316 |

*Primary Examiner*—Stanley H. Tollberg
*Attorney, Agent, or Firm*—Howard C. Miskin

[57] ABSTRACT

A water barrier region is rendered self sealing against water leaks by disposing within or along the region, a water soluble envelope enclosed fluid sealant, which is released by leaking water dissolving the envelope and the released sealant lodges in the water leak passageways to seal the same. The sealant envelopes may be microcapsules or opposing films of polyvinyl alcohol and the sealant may be of a single component type, such as tar dissolved in a volatile solvent, a silicone sealant, or a water reacting powdered cement or a one part polysulfide, one part urethane or a two component type including a liquid curable resin and a curing or catalytic agent, separately enclosed.

2 Claims, 4 Drawing Figures

WATER SEALING CONSTRUCTION

BACKGROUND OF THE INVENTION

The present invention relates generally to improvements in sealing methods and products and it relates more particularly to an improved method and product for effecting the self sealing of water leakage openings and passageways.

There are many structures which require regions or barriers which prevent the passage or penetration of water. Among such structures are roofs, building walls, basement walls and floors, pipe joints, valve packings and glands, and the like. These barriers frequently wear and deteriorate an amount sufficient to permit the passage of water thereby destroying or greatly reducing their usefulness. While in some cases it is not too difficult to replace the water barrier, in many other cases it is sometimes extremely difficult, if not impossible, to repair a leak and it is frequently necessary to replace the entire water barrier. Thus, for example, in the case of roofs, it is frequently impossible to locate the source of a leak, thereby necessitating the complete replacing of the roofing.

SUMMARY OF THE INVENTION

It is accordingly a principal object of the present invention to provide an improved waterproofing method and a product.

Another object of the present invention is to provide an improved method and product for producing a water barrier region.

Still another object of the present invention is to provide an improved method and product for producing a self sealing water barrier.

A further object of the present invention is to provide a method and product of the above nature characterized by its reliability, simplicity, ease of operation, low cost and great versatility and adaptability.

BRIEF DESCRIPTION OF THE DRAWING

The above and other objects of the present invention will become apparent from a reading of the following description taken in conjunction with the accompanying drawing which illustrates preferred embodiments thereof and in which.

In a sense the present invention contemplates the provisions of an improved method for treating a region which functions to provide a barrier to the passage of water to render such region self sealing which method includes the step of disposing along the water barrier region, that is within or proximate to the water barrier region, water rupturable envelope enclosed fluid sealant composition, whereby when an envelope enclosing the fluid sealant is exposed to water consequent to a leak through the water barrier, the envelope is ruptured to release the sealant which flows into and lodges in the leakage passage to seal such passage as well as the surrounding area. The envelopes are advantageously water soluble and may be formed of water soluble polyvinyl alcohol coatings or films. The envelopes may be in the form of capsules either pellet sized or microcapsules which contain the fluid sealants or they may be formed of coextensive water soluble webs which sandwich the fluid sealant and which may be divided into separate cells by being sealed to each other along spaced lines which delineate the cells. The fluid sealant may vary in viscosity and advantageously increase in viscosity a predetermined time following their release to a point where they no longer flow. The sealant may be of a single package or component type or of a double package or component type. For example, the single component sealant may be a free flowing liquid sealant which increases in viscosity or hardens following its release from the envelope, such as a plastic resin, tar, silicone paste or any suitable bonding or adhesive material which is dissolved or dispersed in a volatile solvent or a dry finely powdered cement or plaster which hardens in the presence of water. The adhesive may be in the form of pellets which are individually enclosed in a water soluble envelope defining coating so that upon the dissolving of the coating the pellet reacts with the water to form a fluid self hardening cement or adhesive bonding agent. In the case of a two component sealant, one component may be a curable polymeric resin composition in a liquid state, for example, those containing polyester, alkyl or epoxy resins in an uncured condition and the other component may be a suitable, known curing agent or catalyst for the respective resin composition. The resin composition advantageously includes a curing inhibitor of known composition to prevent the curing of the resin when not exposed to the catalyst or curing agent and the catalyst and curing agent may be contained in microcapsules or pellets dispersed in the uncured liquid resin.

With the present method and product, the effective life of a water barrier is greatly increased, thereby reducing the maintenance requirements, replacement and repair thereof and the method and product are useful in a wide range of applications.

DESCRIPTION OF THE PREFERRED EMBODIMENTS

Figure 1:
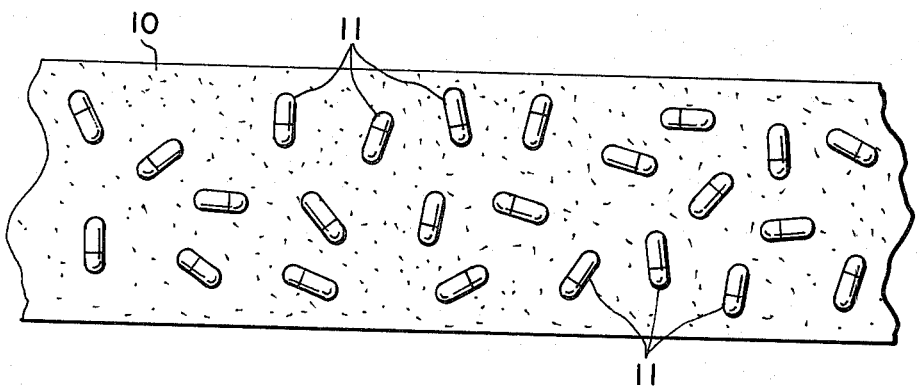
FIG. 1 is an enlarged longitudinal sectional view of a self sealing layer embodying the present invention.

Referring now to the drawing, and more particularly FIG. 1 thereof, which illustrates a preferred embodiment of the present invention, the reference numeral 10 generally designates a primary waterproofing sealant or barrier which is employed as such or which may be used as a bonding agent for water proofing webs such as roofing or water proofing sheets and films for basements, ground slabs and the like, for example polyvinyl alcohol sheets. The primary sealant 10 may be tar, a plastic resin or other suitable material. Uniformly dispensed in water soluble pellets or microcapsules 11 formed of water soluble polyvinyl alcohol, gelatin or the like and which contain a sealant in a fluid state, for example tar dissolved in a volatile solvent to reduce its viscosity, a free flowing powdered, water hardening cement or the like. As an alternative, the microcapsules 11 may be of two groups, one containing a curable polymeric resin in an incured liquid state and the other group containing a suitable curing agent or catalyst as described above, both or one coated.

In the operation of the water barrier 10 provided with the sealant containing capsules 11, any water penetrating the barrier 10 will effect the dissolution of the capsule walls to release the sealant contained therein which in turn will lodge in the leakage passage with hardening or setting to seal such leakage passage. Where a two component sealant as described above is employed capsules containing the resin and the capsules are ruptured and the contents administered in the leakage passage to cure the resin which stops the leak.

Figure 2:
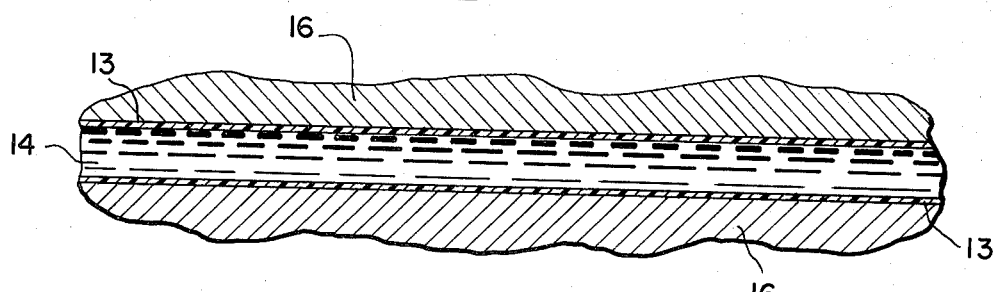
FIG. 2 is an enlarged longitudinal sectional view of the present invention.
Figure 3:
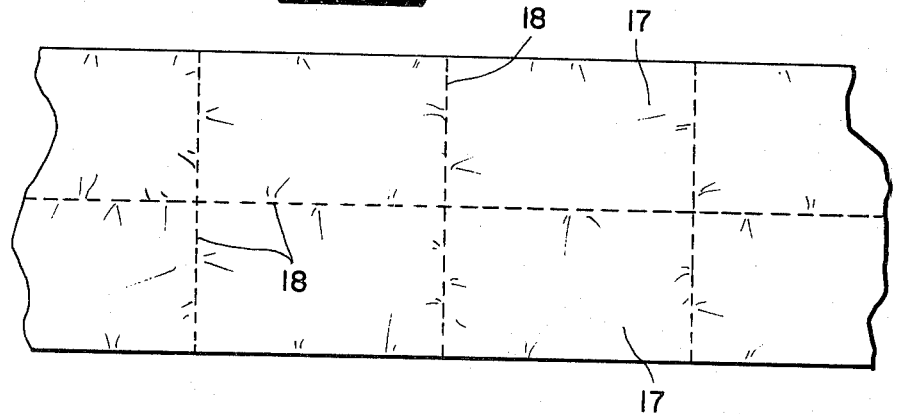
FIG. 3 is a fragmentary top plan view thereof.
Figure 4:
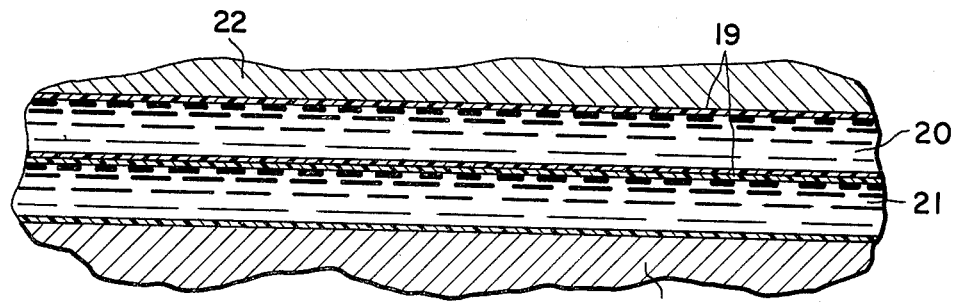
FIG. 4 is a view similar to FIG. 2 of a further embodiment of the present invention.

In FIGS. 2 and 3 of the drawing there is illustrated another embodiment of the present invention in which the secondary fluid sealant is enclosed in a flat envelope of a water soluble material and is coextensive in and with the primary water barrier. Specifically, the envelope is formed of parallel water soluble webs 13, such as of water soluble polyvinyl alcohol, and a sealant 14 in a stable liquid state is enclosed in the envelope. The envelope containing the releasable sealant may be disposed along a face of a water barrier or binding agent 16 or sandwiched between a pair of such barriers or bonding components. Thus, when a water leakage passage occurs, the webs 13 in the area of the leakage passage are dissolved to release the liquid sealant into the leakage passage where it lodges and hardens to effect a water-tight sealing of the leakage passage.

In order to limit the amount of sealant released from the envelope in the event of the water rupture thereof, the envelope is divided into a plurality of cells by transversly and longitudinally extending lines of sealing 18 joining the opposite webs 13. Thus the sealant is stored in separated compartments and only the sealant from the ruptured compartments or cells is released, and the sealant in the intact cells is retained.

Where a two component sealant of the nature described above, that is, where one component is a liquid curable resin and the other component is a curing agent, the components are contained in superimposed coextensive envelopes having water soluble walls. Particularly there are provided three parallel water soluble coextensive webs 19 which are sealed to each other at their binder-like webs 13, and delineate upper and lower separate compartments 20 and 21. Contained in the compartment 20 is one of the two components, the curable resin composition or the curing agent and contained in the other sealant compartment 21 is the other component. The sealant containing envelope is located in or along a water barrier or bonding layer 22 in the manner described above. Moreover, the webs 19 may be sealed to each other along spaced longitudinal and transverse lines to form coinciding separate cells or compartments like cells 17.

In the operation of the system last described, in the area of the passage of leaking water three successive layers 19 are dissolved to effect the release and the intermixing of the two components of the sealant and their advance into the leakage area where the resin component is cured and hardened and lodged to prevent further leakage, such as when the water evaporates, leaving the sealant components. High adhesive strength is not essential, but a sealing effect is desired.

Advantageously, the sealant effect is provided with a urethane or a polysulfide and a catalyst. The catalyst may contain a lead peroxide. The urethane may be water cured.

While there have been described and illustrated preferred embodiments of the present invention, it is apparent that numerous alterations, omissions and additions may be made without departing from the spirit thereof.

What is claimed is:

1. A water barrier structure comprising solid matrix having embedded therein a fluid sealant composition enclosed in a water soluble envelope, said sealant composition comprising a liquid resin curable to a solid state enclosed in water soluble microcapsules, defining said envelope and a curing agent enclosed in other water soluble microcapsues.

2. A water barrier structure comprising a pair of water soluble webs extending along a predetermined area, a fluid sealant composition enclosed in a water soluble envelope sandwiched between said webs, said sealant composition comprising a liquid resin curable to a solid state enclosed in water soluble microcapsules defining said envelope and a curing agent enclosed in other water soluble microcapsules.

* * * * *